(12) United States Patent
Sasaki et al.

(10) Patent No.: US 9,457,437 B2
(45) Date of Patent: Oct. 4, 2016

(54) DEVICE FOR SUPPLYING CONSTANT NUMBER OF SMALL PARTS

(71) Applicant: Nissan Motor Co., Ltd., Kanagawa (JP)

(72) Inventors: Hideo Sasaki, Kanagawa (JP); Hiromi Hoshi, Tochigi (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/392,204

(22) PCT Filed: Apr. 23, 2014

(86) PCT No.: PCT/JP2014/061400
§ 371 (c)(1),
(2) Date: Dec. 23, 2015

(87) PCT Pub. No.: WO2014/208187
PCT Pub. Date: Dec. 31, 2014

(65) Prior Publication Data
US 2016/0136765 A1 May 19, 2016

(30) Foreign Application Priority Data
Jun. 25, 2013 (JP) .................. 2013-132176

(51) Int. Cl.
G07F 11/00 (2006.01)
B23P 19/00 (2006.01)
B65G 47/14 (2006.01)

(52) U.S. Cl.
CPC .......... B23P 19/004 (2013.01); B65G 47/1485 (2013.01)

(58) Field of Classification Search
CPC .. B65G 29/00; B65G 11/12; B65G 47/1485; B23P 19/004

USPC ........ 221/13, 48, 1, 212; 206/531, 538, 534, 206/340

See application file for complete search history.

(56) References Cited

U.S. PATENT DOCUMENTS

| | | | | |
|---|---|---|---|---|
| 3,054,170 A | * | 9/1962 | Benichasa ............. | B65B 7/2807 193/44 |
| 3,065,841 A | * | 11/1962 | Stover ................ | B65G 47/1485 198/392 |
| 3,448,894 A | * | 6/1969 | Modrey ................. | B25B 23/02 221/160 |
| 3,637,065 A | * | 1/1972 | Ruscitti .............. | B65G 47/1485 198/396 |

(Continued)

FOREIGN PATENT DOCUMENTS

JP 63-67544 U 5/1988
JP 3-172214 A 7/1991

(Continued)

*Primary Examiner* — Rakesh Kumar
(74) *Attorney, Agent, or Firm* — Osha Liang LLP

(57) ABSTRACT

A device for supplying small parts has a large-diameter disc that is driven and rotates on a horizontal axis thereof, a hopper disposed close to the large-diameter disc at at least a lower half side of one of side surfaces of the large-diameter disc, wherein the hopper is configured to accommodate therein the small parts in bulk, a first magnet embedded in the one side surface of the large-diameter disc so as to be exposed at the one side surface of the large-diameter disc, wherein the first magnet attracts, at an outer circumferential side edge portion of the one side surface of the large-diameter disc, one of the small parts accommodated in an accommodation space of the hopper, and a small-diameter disc disposed close to the large-diameter disc at an upper side of the large-diameter disc.

16 Claims, 6 Drawing Sheets

(56) References Cited

U.S. PATENT DOCUMENTS

| | | | | |
|---|---|---|---|---|
| 3,674,141 A * | 7/1972 | Abraham | B07C 5/36 | 209/644 |
| 3,731,783 A * | 5/1973 | Dreher | B07C 5/02 | 198/398 |
| 3,741,436 A * | 6/1973 | Hartline | B65G 47/1485 | 198/381 |
| 3,862,536 A * | 1/1975 | Litchfield | B65G 29/02 | 53/246 |
| 3,863,802 A * | 2/1975 | Daniels | B65B 7/28 | 221/175 |
| 3,877,577 A * | 4/1975 | Richard | A47G 21/00 | 134/62 |
| 4,047,637 A * | 9/1977 | Grunstad | B23Q 3/1546 | 206/340 |
| 4,300,462 A * | 11/1981 | Wilkins | A01C 7/04 | 111/89 |
| 4,453,575 A * | 6/1984 | Del Rosso | G01G 13/06 | 141/83 |
| 5,078,300 A * | 1/1992 | Heu | B43M 99/009 | 221/212 |
| 5,096,091 A * | 3/1992 | Heu | B43M 99/009 | 221/212 |
| 5,389,190 A * | 2/1995 | Larsen | B31B 19/90 | 156/521 |
| 5,529,208 A * | 6/1996 | Carstens | G07C 15/005 | 221/1 |
| 5,702,030 A * | 12/1997 | Hulscher | B23P 19/002 | 198/389 |
| 6,345,714 B1 * | 2/2002 | Schmitz | B65G 47/1478 | 198/389 |
| 6,658,814 B2 * | 12/2003 | Spatz | B67B 3/06 | 221/210 |
| 6,786,358 B1 * | 9/2004 | Suzuki | B43M 99/009 | 221/212 |
| 7,166,034 B2 * | 1/2007 | Hines | A63B 57/0006 | 473/137 |
| 7,981,455 B2 * | 7/2011 | Sus | A47J 37/1228 | 426/233 |
| 8,479,671 B2 * | 7/2013 | Shoup | A01C 7/046 | 111/185 |
| 2014/0151393 A1 * | 6/2014 | Simpson | B23P 19/004 | 221/212 |
| 2016/0136765 A1 * | 5/2016 | Sasaki | B65G 47/1485 | 221/13 |

FOREIGN PATENT DOCUMENTS

| | | |
|---|---|---|
| JP | 03172214 A * | 7/1991 |
| JP | 7-13829 U | 3/1995 |
| JP | 2006-143340 A | 6/2006 |
| JP | 2006143340 A * | 6/2006 |
| JP | 2012-224460 A | 11/2012 |
| JP | 2012224460 A * | 11/2012 |

* cited by examiner

FIG. 7A  FIG. 7B
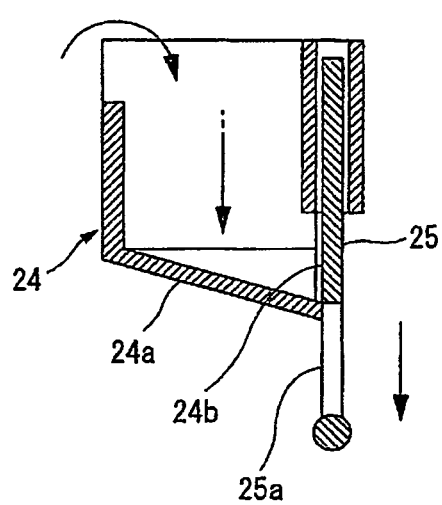
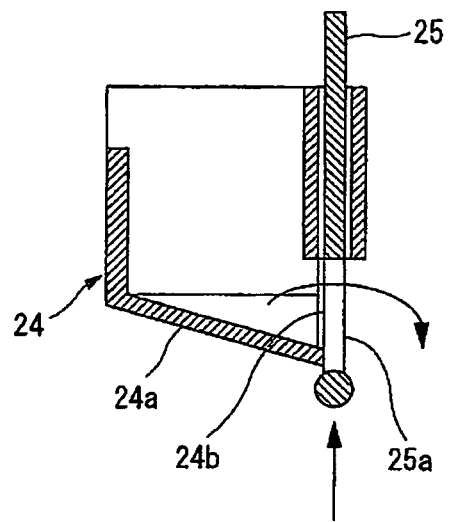

DEVICE FOR SUPPLYING CONSTANT NUMBER OF SMALL PARTS

BACKGROUND

1. Technical Field

The present invention relates to a device for supplying constant number of parts, which counts predetermined necessary number (constant number or constant amount) of small parts such as bolt and nut existing in bulk (in random orientations and positions) and outputs the necessary number of small parts to a parts-output port located in a predetermined position.

2. Related Art

As this kind of device for supplying constant number of small parts, Patent Documents 1, 2 and 3 disclose the devices. In any of these prior art devices for supplying constant number of small parts, small parts such as bolt and nut are accommodated in bulk (in random orientations and positions) in a hopper, and a rotary disc embedded with magnets on a side surface of the rotary disc is set in the hopper. The rotary disc attracts one small parts by the magnet and raises it by rotation of the rotary disc while holding the one small parts by the magnet. The number of the small parts and a direction of the small parts are gradually limited by being made contact with a plurality of guide plates etc. that are provided in a rotation direction of the rotary disc. Then, each small parts is outputted to a predetermined conveyance line by being forcibly separated from the magnet by a final guide plate.

However, the prior art devices for supplying constant number of small parts disclosed in the Patent Documents 1, 2 and 3 are configured to output or take out one small parts, in principle, by one-time attraction of the small parts by the magnet and multi-time limitation and separation by the guide plates. Because of this, in order to certainly output one small parts, there is a need to repeat trial-and-error for determining shape and position of the guide plate etc. Further, in some cases, two small parts might be outputted at once. As a consequence, it takes long time to carry out the trial until facilities are formally launched. And also, there is still room for improvement in reliability of the output of the constant number of the small parts.

CITATION LIST

Patent Document

Patent Document 1: Japanese Unexamined Utility Model Publication No. 7-13829
Patent Document 2: Japanese Unexamined Patent Publication No. 7-117859
Patent Document 3: Japanese Unexamined Utility Model Publication No. 63-67544

SUMMARY OF THE INVENTION

One or more embodiments of the present invention provides a device for supplying constant number of parts, which improves the reliability of the output of the constant number of the small parts.

A device for supplying constant number of parts according to one or more embodiments of the present invention raises small parts attracted by a first magnet embedded in one side surface of a rotary large-diameter disc to an upper side, separates the small parts from the first magnet by a separation chute disposed close to the large-diameter disc, and transfers the small parts to the separation chute. A small-diameter disc that rotates together with the large-diameter disc is placed close to the separation chute, and the small-diameter disc attracts the small parts existing on the separation chute to an outer circumferential surface of the small-diameter disc by a magnetic force of a second magnet that is embedded in the small-diameter disc. Further, a parts-output port is disposed at an opposite side to the separation chute with respect to the small-diameter disc, and the small parts at the small-diameter disc side is separated at the parts-output port and transferred to the parts-output port side. Then, in a process of transfer of the small parts attracted to the small-diameter disc from the separation chute side to the parts-output port side, presence of the small parts, i.e. the number of small parts transferred to the parts-output port side, is detected by a detecting unit.

According to one or more embodiments of the present invention, the small parts attracted by the first magnet on the large-diameter disc side is separated once by the separation chute, and is attracted again by the second magnet on the small-diameter disc side, then is outputted to the parts-output port side. Accordingly, as compared with the case of the related art in which the small parts attracted by the magnet is repeatedly limited by the plurality of guide plates, so-called output of two small parts can be excluded, and reliability of the output number of the small parts is improved. In addition, it is possible to greatly shorten a time of the trial required to formally launch the facilities.

BRIEF DESCRIPTION OF DRAWINGS

FIGS. 7A and 7B are drawings for explaining a structure of a parts-output box that replaces the parts-output plate of FIG. 6.

DETAILED DESCRIPTION

Figure 1:
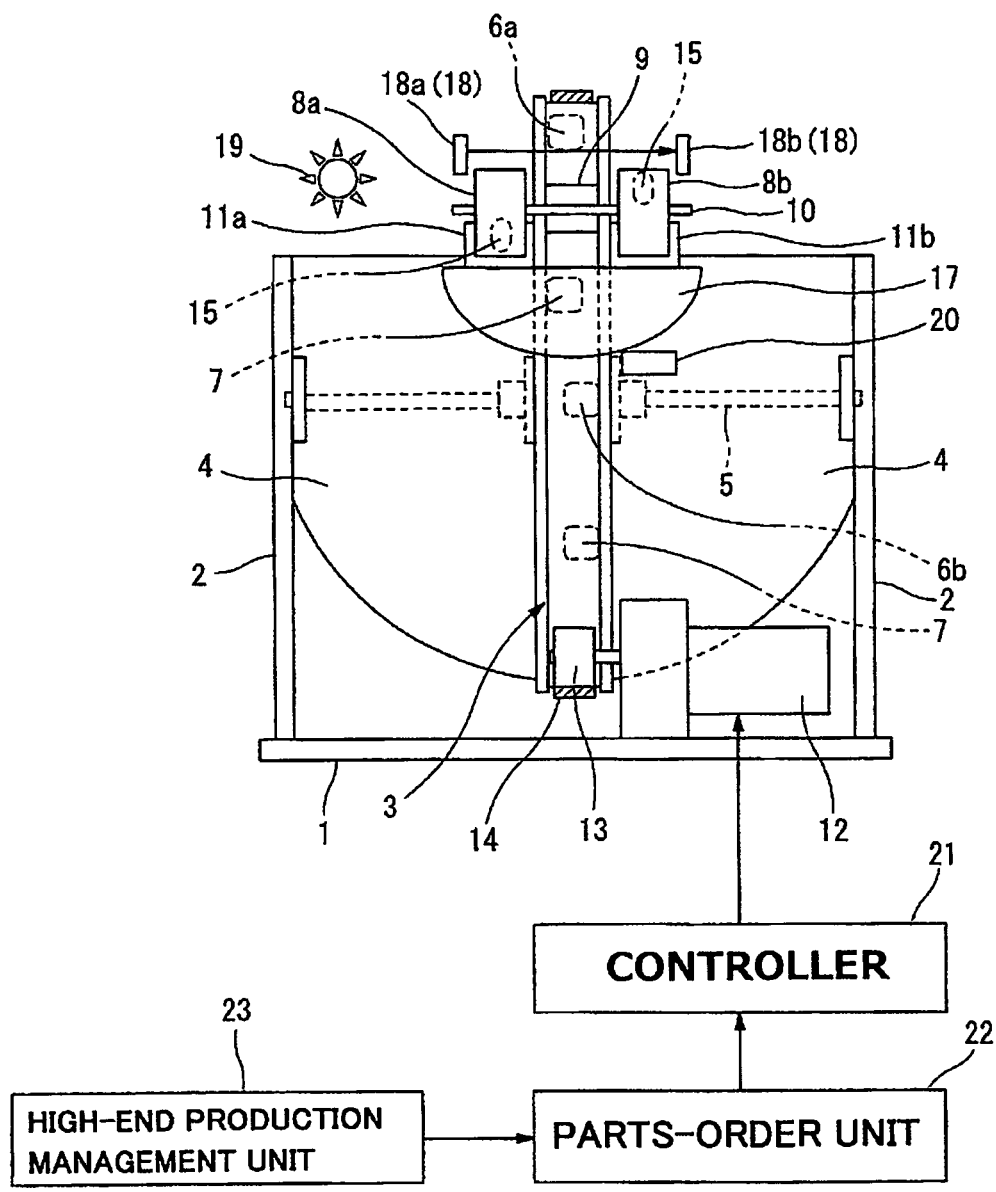
FIG. 1 is a front view for explaining a device for supplying constant number of parts according to one or more embodiments of the present invention.
Figure 2:
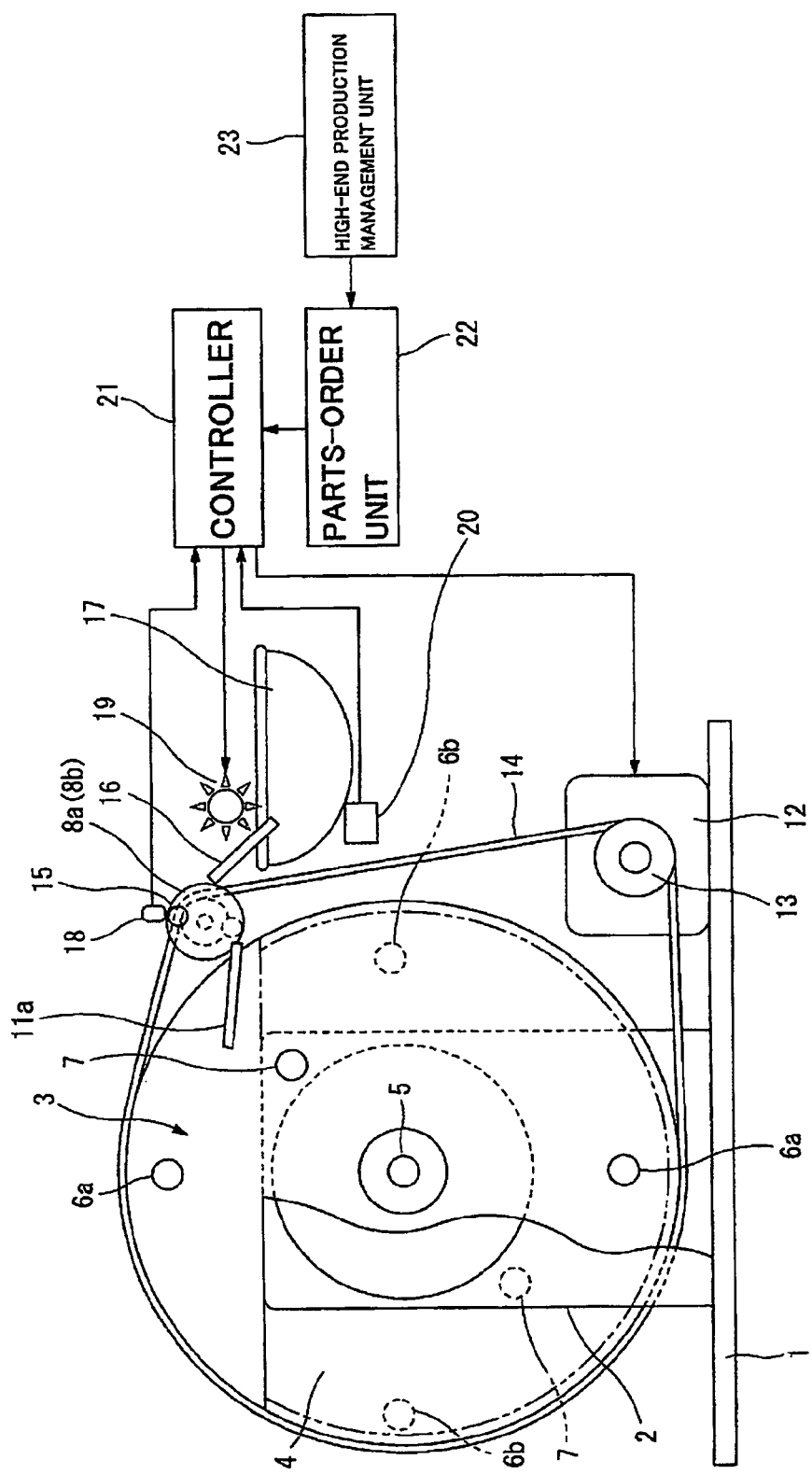
FIG. 2 is a left side view for explaining the device for supplying constant number of parts shown in FIG. 1.
Figure 3:
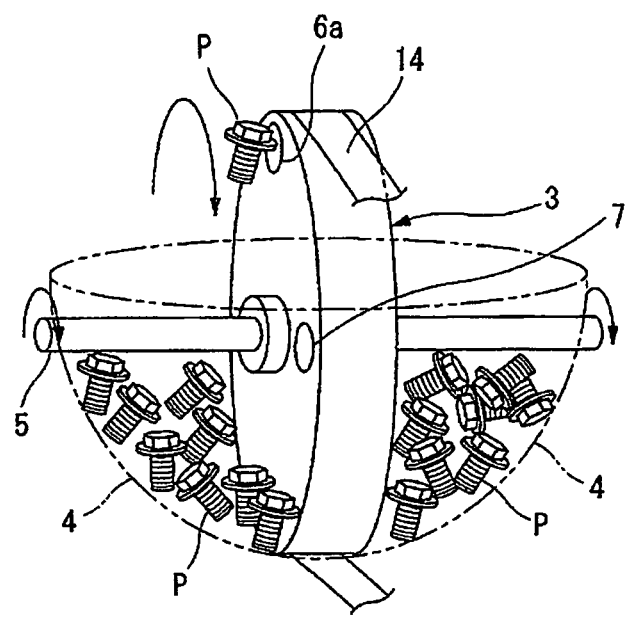
FIG. 3 is a perspective view showing relationship between a hopper and a large-diameter disc shown in FIGS. 1 and 2.
Figure 4:
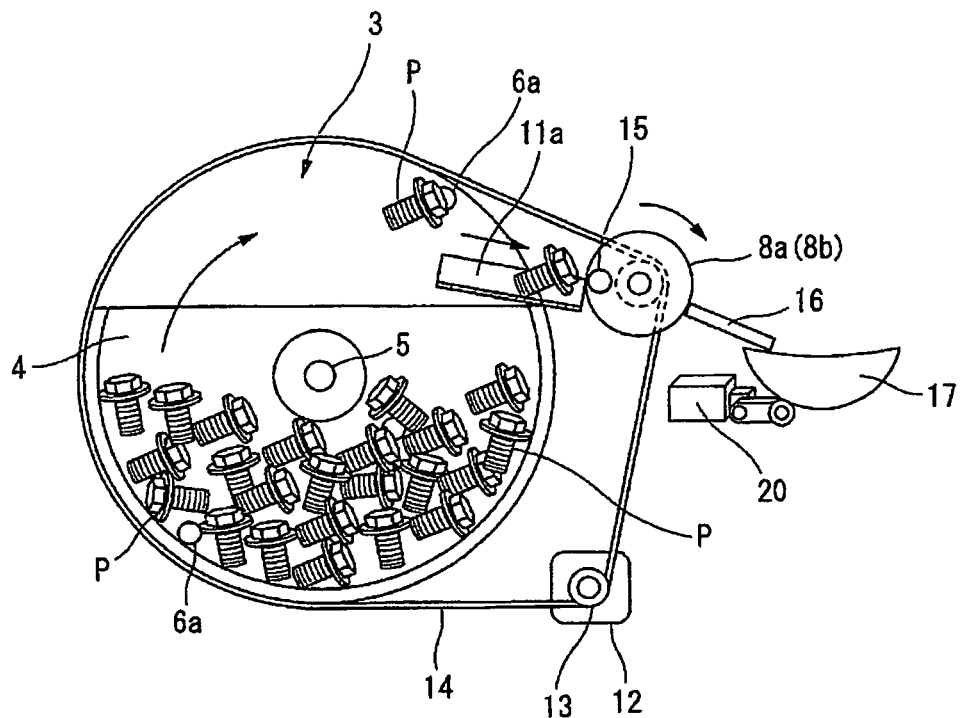
FIG. 4 is a drawing for explaining relationship between the large-diameter disc, a separation chute, a small-diameter disc, a guide chute and a parts-output plate shown in FIGS. 1 and 2.
Figure 5:
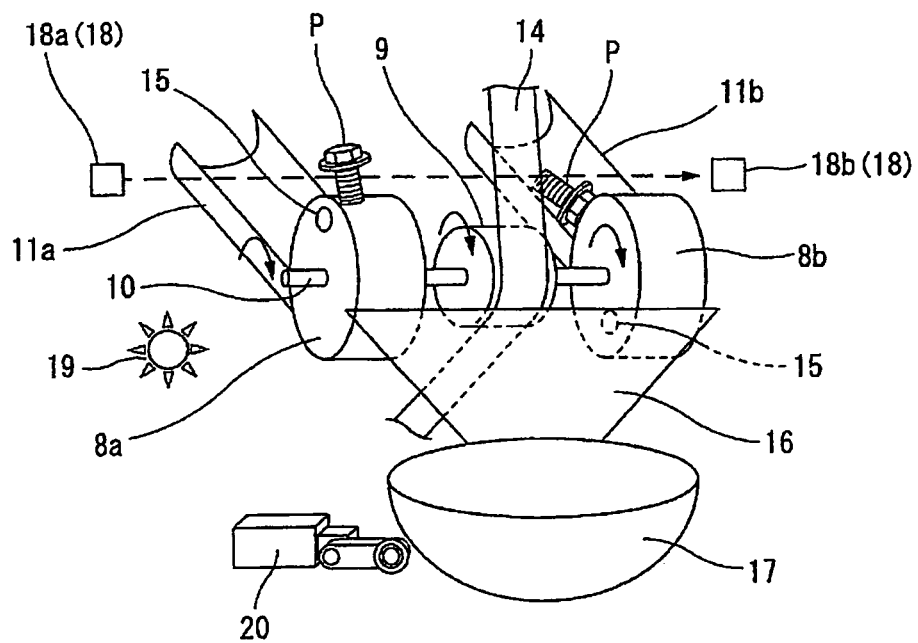
FIG. 5 is a perspective view showing relationship between main parts such as the separation chute, the small-diameter disc, the guide chute and the parts-output plate shown in FIG. 4.

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. FIGS. 1 to 5 show a device for supplying constant number of parts (a constant-number-of-parts-supplying device) according to one or more embodiments of the present invention. FIG. 1 is a front view for explaining the whole device. FIG. 2 is a left side explanatory drawing of the device shown in FIG. 1. Further, FIGS. 3 to 5 show details of main parts of the device shown in FIGS. 1 and 2.

Here, an example is shown where, for instance, the constant-number-of-parts-supplying device is provided at a line side of an assembly line for vehicle, and constant number (constant amount) of bolt having a washer that is within a range of e.g. one to approx. ten (an arbitrary number of the bolt having the washer can be set), which is the required number of the bolt having the washer to assemble interior parts of a specific vehicle model by a worker according to a designated specification of the interior parts (the required number of the bolt having the washer for the assembly is different depending on the designated specification of the interior parts), is supplied.

As shown in FIG. 3 in addition to FIGS. 1 and 2, a pair of side plates 2, 2 are provided parallel to each other at right and left sides on a bottom plate 1. Between these side plates 2, 2, a large-diameter disc 3 and a pair of almost quarter spherical hoppers 4 are set. The large-diameter disc 3 is rotatably supported on its both sides by the pair of side plates 2 through a shaft 5. The pair of hoppers 4 are disposed close to large-diameter disc 3, and set symmetrically at both sides (right and left sides) of the large-diameter disc 3. With these settings, as shown in FIGS. 3 and 4, each hopper 4 forms, together with the large-diameter disc 3, an accommodation space for a number of bolts P, P . . . having the washer (hereinafter, simply called bolt P) as the small parts that are an object of the constant supply.

Diameters of these large-diameter disc 3 and hopper 4 are substantially the same, and both outlines are almost (or substantially) identical to each other when viewed from the side of the device as shown in FIGS. 2 and 4. An upper opening of each hopper 4 is positioned at an upper side with respect to the shaft 5. Then, as shown in FIGS. 3 and 4, a number of bolts P, P . . . are accommodated and stored in bulk (in random orientations and positions) in the accommodation spaces of the both hoppers 4.

The large-diameter disc 3 is made of light metal, and a resin sheet (not shown) is pasted on both side surfaces, which the bolts P, P . . . touch, of the large-diameter disc 3. The large-diameter disc 3 also serves as a pulley for an after-mentioned cogged belt (synchronous belt or toothed belt) 14, and a number of teeth (not shown) are formed on an outer circumferential surface of the large-diameter disc 3. A pair of short cylindrical magnets (permanent magnets) 6a, as first magnets, are embedded in one of the side surfaces of the large-diameter disc 3 in 180 degree phase positions at an outer circumferential side edge portion of the side surface. Likewise, a pair of magnets 6b, as first magnets, are embedded in the other of the side surfaces of the large-diameter disc 3 in 180 degree phase positions, which are shifted by 90 degrees from the phase positions of the magnets 6a embedded in the one side surface, at an outer circumferential side edge portion of the side surface. These magnets 6a and 6b are exposed at the respective side surfaces of the large-diameter disc 3 so that the magnets 6a and 6b and the respective side surfaces of the large-diameter disc 3 form an even surface. As the magnets 6a and 6b, a magnet having suitable size and magnetic force to attract and hold one bolt P is employed. For instance, the magnet is a detachable/attachable magnet so that the magnet can be changed according to size and weight of the bolt P. Therefore, as shown in FIGS. 3 and 4, when the large-diameter disc 3 rotates, one bolt P is attracted and held by the magnet 6a or 6b, and the bolt P is alternately raised to an upper side in a rotation direction by one side surface and the other side surface of the large-diameter disc 3.

Here, a mixing (or stir or agitation) magnet (mixing permanent magnet) 7 is embedded in both side surfaces of the large-diameter disc 3 in a center side position with respect to the bolt attraction magnets 6a and 6b. The mixing magnets 7 are not intended for attraction and raise of the bolt P, but are disposed for mixing the bolts P in the accommodation space of the hopper 4, i.e. the mixing magnets 7 are intended for randomization of position (attitude) and direction (orientation) of each bolt P. In other words, the mixing magnet 7 is a magnet that avoids a situation in which the plurality of bolts P having the washer become a relatively large mass of bolt by the washer and a thread of the bolt P intertwining with each other, then the bolt P cannot be attracted by the bolt attraction magnets 6a and 6b.

A pair of small-diameter discs 8a, 8b are disposed close to the large-diameter disc 3 at an upper side of the large-diameter disc 3 so that axes of the small-diameter discs 8a, 8b are parallel to an axis of the large-diameter disc 3. As shown in FIG. 5 in addition to FIGS. 1 and 2, these small-diameter discs 8a, 8b and a small-diameter pulley 9 are coaxially arranged and integrally fixed to a shaft 10. The shaft 10 is rotatably supported on its both sides by a stay (not shown) extending from the side plates 2. That is, in the front views of FIGS. 1 and 5, the small-diameter discs 8a, 8b are located on opposite sides of the large-diameter disc 3. Further, as described later, between upper both side surfaces of the large-diameter disc 3 and the small-diameter discs 8a, 8b, separation chutes 11a, 11b, such as warped gutter shaped chutes, having a separation function of the bolt P from the magnets 6a and 6b provided at the large-diameter disc 3 side, are set like a spanning bridge (so as to span a space between the large-diameter disc 3 and the small-diameter discs 8a, 8b). These separation chutes 11a, 11b are positioned on rotation loci of the magnets 6a and 6b provided at the large-diameter disc 3 side, and have downslope toward the small-diameter discs 8a, 8b, namely that the separation chutes 11a, 11b incline downwards toward the small-diameter discs 8a, 8b. With these settings, as shown in FIG. 4, when the bolt P attracted and held by the magnet 6a or 6b on the side surface of the large-diameter disc 3 passes the separation chute 11a or 11b, the bolt P is separated from the magnet 6a or 6b and transfers to the separation chute 11a or 11b, then slides on the separation chute 11a or 11b toward the small-diameter discs 8a, 8b by its own weight.

On the bottom plate 1 shown in FIGS. 1 and 2, as a rotation drive unit or a rotation driver, a motor 12 having reduction gears is disposed. Then, the cogged belt 14, as a winding transmission unit or a winding transfer, is wound around a drive pulley 13 at a motor shaft side, the pulley 9 at the small-diameter disc 8a, 8b side and the large-diameter disc 3. With this setting, by start and operation of the motor 12, the large-diameter disc 3 and the small-diameter discs 8a, 8b rotate in synchronization with each other at a predetermined speed ratio determined by a ratio of the diameter between both the large-diameter disc 3 and the small-diameter discs 8a, 8b. Here, as the motor 12, in order to be able to adjust a circle time required to output or take out the constant number of bolt P, a variable-speed type motor is desirable.

As shown in FIGS. 4 and 5 in addition to FIGS. 1 and 2, a rod-like magnet (permanent magnet) 15, as a second magnet, is embedded in an outer circumferential edge portion of each of the small-diameter discs 8a, 8b so as to penetrate the small-diameter discs 8a, 8b in a thickness direction. Rotation direction phase positions of these magnets 15 embedded in one small-diameter disc 8*a* and the other small-diameter disc 8*b* are shifted by 180 degrees. Then, the speed ratio between the large-diameter disc 3 and the small-diameter discs 8*a*, 8*b* is previously set so that, as described above, when the bolt P transfers to the separation chute 11*a*, 11*b* side from the large-diameter disc 3 side, the magnet 15 embedded in the small-diameter disc 8*a* or 8*b* passes by an immediate position of the bolt P on the separation chute 11*a* or 11*b* slightly later than the transfer of the bolt P to the separation chute 11*a*, 11*b* side. Therefore, the bolt P on the separation chute 11*a* or 11*b* is attracted and held by the magnet 15 embedded in the outer circumferential surface of the small-diameter disc 8*a* or 8*b* at a time when the magnet 15 in the small-diameter disc 8*a* or 8*b* passes by the immediate position of the bolt P on the separation chute 11*a* or 11*b*. That is, transfer of the bolt P from the separation chute 11*a* or 11*b* to the small-diameter disc 8*a* or 8*b* is alternately repeated at one small-diameter disc 8*a* side and the other small-diameter disc 8*b* side.

An output plate 17 as a parts-output port and a guide chute 16 that is an output chute of the bolt P are disposed at an opposite side to the separation chute 11*a*, 11*b* with respect to the pair of small-diameter discs 8*a*, 8*b*. Each of the output plate 17 and the guide chute 16 is fixed and supported by a stay (not shown) extending from the bottom plate 1 or the side plates 2. Both the small-diameter discs 8*a*, 8*b* share these output plate 17 and guide chute 16. The guide chute 16 is set with its upper end portion located close to the both small-diameter discs 8*a* and 8*b*, and inclines downwards toward the output plate 17. The output plate 17 is, for instance, a circular deep bowl, and this shape is considered so that ultimately the plurality of bolts P, which are supplied to the output plate 17 as the constant number of bolts P, can be grasped by worker's one-time one-hand grasping operation. Then, when the bolt P attracted and held by the outer circumferential surface of the small-diameter disc 8*a* or 8*b* passes the upper end portion of the guide chute 16, the bolt P on the small-diameter disc 8*a*, 8*b* side is separated and slides off from the guide chute 16 to the output plate 17, then is outputted. Such operation is alternately repeated at one small-diameter disc 8*a* side and the other small-diameter disc 8*b* side.

As explained above, in one or more embodiments of the present invention, as shown in FIGS. 1, 3 and 5, the hoppers 4 are set symmetrically at both sides (right and left sides) of the common large-diameter disc 3, and mutually independent separation chutes 11*a* and 11*b* and small-diameter discs 8*a* and 8*b* are respectively disposed symmetrically at both sides (right and left sides) of the large-diameter disc 3 while sharing the large-diameter disc 3, the guide chute 16 and the output plate 17. Here, in one or more of the above embodiments, although the guide chute 16 and the output plate 17 are separately provided, both of the guide chute 16 and the output plate 17 could be provided as an integral component, as necessary.

As shown in FIGS. 4 and 5 in addition to FIGS. 1 and 2, as a noncontact detecting unit or detector, a through-beam type photoelectric (or optoelectronic) sensor 18 formed from a light projector (a phototransmitter) 18*a* and a light receiver (a photoreceiver) 18*b* is provided close to upper sides of the pair of small-diameter discs 8*a* and 8*b*. Further, a constant number output completion lamp 19 and a reset switch 20 such as a limit switch are provided close to the output plate 17. The constant number of the bolt P (the number of bolt P) to be outputted to the output plate 17 is previously set as a setting value on an after-mentioned controller 21 side. Thus, each time the bolt P attracted and held by the outer circumferential surface of the small-diameter disc 8*a* or 8*b* passes an optical axis of the photoelectric sensor 18, one bolt P is detected by the photoelectric sensor 18 as one bolt P outputted to the output plate 17. Further, when the number of bolt P outputted to the output plate 17 reaches the setting value, the rotation drive of the large-diameter disc 3 and the small-diameter discs 8*a*, 8*b* by the motor 12 is immediately stopped, and at the same time, the above-mentioned constant number output completion lamp 19 lights up.

In FIGS. 1 and 2, a reference sign 21 is a controller, as a control unit, that performs total control of the constant-number-of-parts-supplying device configured above, especially performs start and operation control of the motor 12. The photoelectric sensor 18, the constant number output completion lamp 19 and the reset switch 20 are connected to the controller 21. Here, as a higher controller of the controller 21, a parts-order unit 22 is provided. Further, as a higher controller of the parts-order unit 22, a high-end production management unit 23 is provided.

Next, a series of working or operation of the constant-number-of-parts-supplying device configured above will be explained.

As shown in FIGS. 1 and 2, when the motor 12 is operated by a command from the controller 21, the large-diameter disc 3 and the small-diameter discs 8*a*, 8*b* continuously rotate in synchronization with each other at the predetermined speed ratio, and as described later, the bolt P is supplied to the parts-output plate 17 one by one through the large-diameter disc 3 and the small-diameter discs 8*a*, 8*b*. Then, at the time when the number of bolt P outputted to the parts-output plate 17 reaches the constant number (the setting value), the synchronous rotation of the large-diameter disc 3 and the small-diameter discs 8*a*, 8*b* by the motor 12 is immediately stopped.

Here, in a case where specific interior parts of a specific vehicle model are assembled at a specific stage on an assembly line for vehicle and then the required number of the bolt for the assembly of the interior parts is different depending on a specification of the interior parts, information about the required number of bolt P for the assembly of the interior parts is given to the controller 21 from the parts-order unit 22 on the basis of vehicle model information and spec information of the interior parts from the high-end production management unit 23, and the setting value of the number of bolt P (the constant number of bolt P) is set in the controller 21. In response to this set of the setting value of the number of bolt P, the controller 21 starts and operates the motor 12, and continuously rotate the large-diameter disc 3 and the small-diameter discs 8*a*, 8*b* in synchronization with each other at the predetermined speed ratio.

As shown in FIGS. 3 and 4 in addition to FIGS. 1 and 2, when the large-diameter disc 3 positioned in the middle of the two hoppers 4, 4 rotates, one bolt P existing in the right and left side hoppers 4, 4 is attracted and held by the magnet 6*a* or 6*b* and raised to the upper side in the rotation direction of the large-diameter disc 3. Subsequently, as shown in FIGS. 4 and 5, when the bolt P attracted and held by the magnet 6*a* or 6*b* reaches a position of the separation chute 11*a* or 11*b*, the bolt P is separated from the magnet 6*a* or 6*b* by the separation chute 11*a* or 11*b* with the bolt P scraped off by the separation chute 11*a* or 11*b*, and transfers to the separation chute 11*a* or 11*b*.

In this case, by properly determining the diameter and the magnetic force of the magnets 6*a* and 6*b* provided at the large-diameter disc 3 side, it is possible to avoid a situation in which the plurality of bolts P are attracted by the single magnet 6*a* or 6*b* at once. In addition, even if two bolts P are attracted by the single magnet 6a or 6b, when the two bolts P pass the separation chute 11a or 11b, one of the two bolts P is forcibly excluded or removed and falls to an inside of the hopper 4. Moreover, even if the two bolts P should transfer to the separation chute 11a or 11b, by limiting directions of stems of the two bolts P to a series direction on the separation chute 11a or 11b, the two bolts P are not attracted at once (at the same time) when being attracted by the small-diameter disc 8a or 8b.

As shown in FIG. 4, when the bolt P transfers to the separation chute 11a or 11b, the bolt P having transferred to the separation chute 11a or 11b approaches the small-diameter disc 8a or 8b by its own weight, then is attracted to and held on the outer circumferential surface of the small-diameter disc 8a or 8b by the magnet 15 embedded in the small-diameter disc 8a or 8b, which passes by the bolt P in a close position to the bolt P later than the transfer of the bolt P to the separation chute 11a or 11b. That is, a rotation ratio (the speed ratio) between the large-diameter disc 3 and the small-diameter discs 8a, 8b is previously set so that the magnet 15 embedded in the small-diameter disc 8a or 8b passes by the bolt P in the close position to the bolt P sliding on the separation chute 11a or 11b later than a timing of the transfer of the bolt P from the magnet 6a or 6b of the large-diameter disc 3 to the separation chute 11a or 11b.

Further, as shown in FIGS. 4 and 5, when the bolt P attracted and held by the outer circumferential surface of the small-diameter disc 8a or 8b moves up to the guide chute 16 by the rotation of the small-diameter disc 8a or 8b, the bolt P on the small-diameter disc 8a or 8b side is forcibly separated by the guide chute 16 with the bolt P scraped off by the guide chute 16. With this working or operation, the bolt P having been attracted to the small-diameter disc 8a or 8b slides on or tumbles down the guide chute 16 by its own weight, then finally the bolt P is outputted to the parts-output plate 17.

Here, as shown in FIG. 5 showing, an example, the bolt P attracted by the left side small-diameter disc 8a, the bolt P attracted to the small-diameter disc 8a or 8b passes an optical axis position of the photoelectric sensor 18, which both the small-diameter discs 8a and 8b share, before being scraped off by the guide chute 16, and momentarily intercepts or cuts off the optical axis of the photoelectric sensor 18. With this, it is judged that one bolt P is outputted to the parts-output plate 17. By this detection output of the photoelectric sensor 18, the controller 21 counts the number of bolt P outputted to the parts-output plate 17, and continues it until this count value reaches the setting value. Here, instead of the photoelectric sensor 18, a sensor that senses the magnetic force of the magnet 15 attracting the bolt P on the outer circumferential surfaces of the small-diameter discs 8a, 8b could be used.

Further, the two magnets 6a are mounted on one of the side surfaces of the large-diameter disc 3 in 180 degree phase positions, while the two magnets 6b are mounted on the other of the side surfaces of the large-diameter disc 3 in 180 degree phase positions which are shifted by 90 degrees with respect to the phase positions of the magnets 6a embedded in the one side surface, which is previously explained.

Accordingly, during the continuous synchronous rotation of the large-diameter disc 3 and the small-diameter discs 8a, 8b, the transfer movement of the bolt P from the magnet 6a or 6b of the large-diameter disc 3 to the separation chute 11a or 11b, the transfer movement of the bolt P from the separation chute 11a or 11b to the small-diameter disc 8a or 8b and the transfer movement of the bolt P from the small-diameter disc 8a or 8b to the guide chute 16 are alternately repeated at one small-diameter disc 8a side and the other small-diameter disc 8b side. As a consequence, the output of one bolt P to the parts-output plate 17 is intermittently carried out.

Furthermore, as mentioned above, since the mixing magnet 7 is mounted on both side surfaces of the large-diameter disc 3, the bolts P accommodated in the hoppers 4 are mixed by and according to the rotation of the large-diameter disc 3. This thus avoids the situation in which the bolts P having the washer become a relatively large mass of bolt by the washer and a thread of the bolt P intertwining with each other, thereby stably outputting the bolt P one by one.

Then, when the bolt(s) P is(are) outputted to the parts-output plate 17 by the setting number, which means that the count value of the bolt P in the controller 21 reaches the setting value, the controller 21 immediately stops the rotation of the large-diameter disc 3 and the small-diameter discs 8a, 8b by the motor 12, and also turns on the above-mentioned constant number output completion lamp 19. During rotation stop of the large-diameter disc 3 and the small-diameter discs 8a, 8b, although the bolt P is kept attracted and raised by the magnets 6a, 6b of the large-diameter disc 3, or although the bolt P remains on the separation chutes 11a, 11b, these cause no problem. Here, the lighting of the constant number output completion lamp 19 continues until the bolt(s) P in the parts-output plate 17 is(are) taken out.

Subsequently, the worker visually checks the lighting of the constant number output completion lamp 19 and takes out all of the bolts P outputted to the parts-output plate 17, and pushes on the reset switch 20 for verification, then the device becomes an ON state. Only after receiving a signal from the reset switch 20, the constant number output completion lamp 19 goes off, and the setting value of the number of bolt P and the count value (count number) are reset (clear) in the controller 21. Then, a series of working or operation with the setting of the number of bolt P being a first operation is repeated.

According to the constant-number-of-parts-supplying device of one or more embodiments of the present invention, besides the attraction of the bolt P by the magnets 6a, 6b of the large-diameter disc 3, the transfer movement of the bolt P from the magnets 6a, 6b of the large-diameter disc 3 to the separation chutes 11a, 11b, the transfer movement of the bolt P from the separation chutes 11a, 11b to the small-diameter discs 8a, 8b and the transfer movement of the bolt P from the small-diameter discs 8a, 8b to the guide chute 16 are alternately repeated at one small-diameter disc 8a side and the other small-diameter disc 8b side. Therefore, so-called output of two bolts P is excluded, and reliability of the output of one bolt P is improved, and it is consequently possible to greatly improve reliability of the output number of bolt P by the constant-number-of-parts-supplying device.

Further, the mixing magnet 7 is provided at the large-diameter disc 3. This thus avoids the situation in which the bolts P having the washer become a relatively large mass of bolt by the washer and a thread of the bolt P intertwining with each other, thereby stably outputting the bolt P one by one.

Moreover, the both outlines of the quarter spherical hoppers 4 and the large-diameter disc 3 are almost identical to each other when viewed from the side of the device, and the magnets 6a, 6b are provided at the outer circumferential side edge portion of each side surface of the large-diameter disc 3. Thus, even if the number of bolt P in the accommodation spaces of the hoppers 4 decreases, the bolt P in the accommodation spaces slides and drops so as to come to or approach the magnets 6a, 6b of the large-diameter disc 3. As a consequence, even if only one bolt P remains in the hoppers 4, the one bolt P can be certainly attracted by the magnets 6a, 6b.

Furthermore, since output of the bolt P is alternately carried out in 180 degree phase positions on both sides of the large-diameter disc 3, the circle time required to output or take out the constant number of bolt P becomes short, then output or take-out of the constant number of bolt P can be efficiently performed. In addition, the cogged belt 14 is used, as the winding transmission unit, for the synchronous rotation of the large-diameter disc 3 and the small-diameter discs 8a, 8b. Therefore, this has the advantage of achieving stable mechanical synchronization of the large-diameter disc 3 and the small-diameter discs 8a, 8b.

Figure 6:
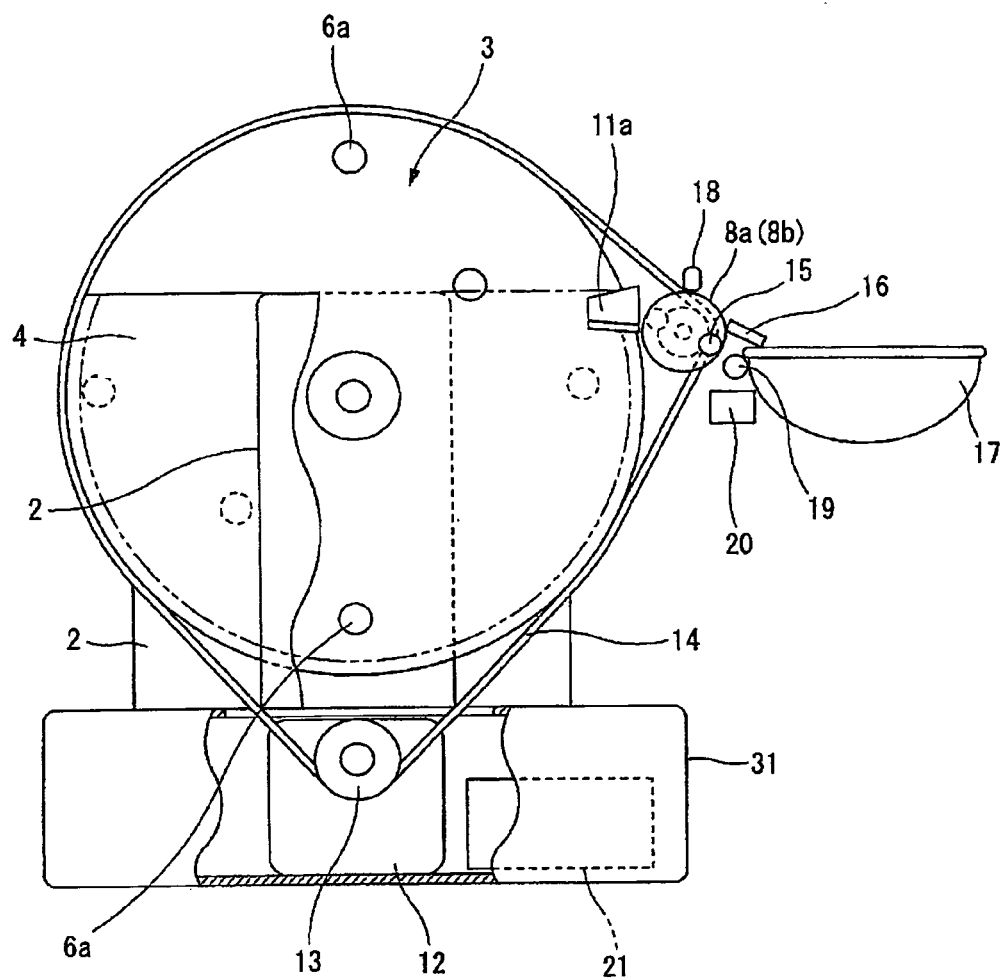
FIG. 6 is a side view for explaining a device for supplying constant number of parts according to one or more embodiments of the present invention.

FIG. 6 shows a for supplying constant number of parts (the constant-number-of-parts-supplying device) according to one or more embodiments of the present invention. Same element or component as that in FIG. 2 is denoted by the same reference sign.

In one or more embodiments of the present invention, as can be understood from comparison between FIGS. 6 and 2, instead of the bottom plate 1 in FIG. 2, a box-shaped stage 31 is provided, and the motor 12 and the controller 21 are accommodated in the stage 31.

In this case, instead of the output plate 17 in FIG. 6, a shutter-type output box 24 shown in FIGS. 7A-7B could be employed. Regarding this output box 24, as shown in FIG. 7A, a bottom portion 24a inclines downwards in a forward direction, and a shutter plate 25 having an opening 25a at a front side of the output box 24, where an opening 24b of the output box 24 opens at a lower portion of the output box 24, is disposed. The output box 24 stores the bolt P until the number of bolt P reaches the constant number of bolt P. The stored bolt P is prevented from dropping by a section except the opening 25a of the shutter plate 25. In a case where the worker takes out the bolt P stored in the output box 24, as shown in FIG. 7B, by raising the shutter plate 25 so that the opening 24b opens by opening of the opening 25a, the stored bolt P slides on or tumbles down the bottom portion 24a, then the worker takes out the bolt P through the openings 24b and 25a.

Here, according to one or more embodiments of the present invention, the pushing operation of the reset switch 20 shown in FIGS. 4 and 5 are done by a raising operation of the shutter plate 25.

In one or more of the above embodiments, as the small parts that are the object of the constant supply, as an example, the bolt P having the washer is shown. However, the small parts of the object of the constant supply are not limited to the bolt. They could be parts having stem or shaft, step-shaped parts, and small parts such as washer. Here, it is desirable that shape and magnitude of magnetic force of the magnets 6a, 6b and 15 and also shape of the separation chutes 11a, 11b should be properly determined depending on size and shape of the parts to be supplied.

Further, although one or more of the above embodiments shows a case where the large-diameter disc 3 and the small-diameter discs 8a, 8b are driven and rotate in synchronization with each other through the cogged belt 14, the present invention is not limited to this case. According to one or more embodiments of present invention, the large-diameter disc 3 and the small-diameter discs 8a, 8b rotate together during the output of the small parts. According to one or more embodiments of the present invention, the large-diameter disc 3 and the small-diameter discs 8a, 8b independently rotate without synchronization.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A device for supplying small parts comprising:
a large-diameter disc that is driven and rotates on a horizontal axis thereof;
a hopper disposed close to the large-diameter disc at at least a lower half side of one of side surfaces of the large-diameter disc, wherein the hopper is configured to accommodate therein the small parts in bulk;
a first magnet embedded in the one side surface of the large-diameter disc so as to be exposed at the one side surface of the large-diameter disc, wherein the first magnet attracts, at an outer circumferential side edge portion of the one side surface of the large-diameter disc, one of the small parts accommodated in an accommodation space of the hopper;
a small-diameter disc disposed close to the large-diameter disc at an upper side of the large-diameter disc so that an axis of the small-diameter disc is parallel to the axis of the large-diameter disc, wherein the small-diameter disc is driven and rotates on an axis thereof;
a separation chute disposed between the large-diameter disc and the small-diameter disc so as to span a space between the large-diameter disc and the small-diameter disc, wherein the separation chute separates the small parts that are attracted to the large-diameter disc by the first magnet from the large-diameter disc, and receives the small parts;
a second magnet embedded in the small-diameter disc, wherein the second magnet attracts, on an outer circumferential surface of the small-diameter disc, the small parts that are on the separation chute;
a parts-output port disposed close to the small-diameter disc at an opposite side to the separation chute with respect to the small-diameter disc, wherein the parts-output port separates the small parts that are attracted to the small-diameter disc from the small-diameter disc, and outputs the small parts;
a rotation driver that drives rotation of the large-diameter disc and the small-diameter disc;
a detector that detects the small parts outputted to the parts-output port, wherein the detector performs the detection of the small parts while the small parts are being attracted on the outer circumferential surface of the small-diameter disc; and
a controller that controls a drive control of the rotation driver, configured to:
set an arbitrary number of the small parts to be outputted to the parts-output port,
count the number of the small parts outputted to the parts-output port by an output of the detector, and
stop the rotation driver at a time when a count number reaches a setting value,
wherein the hoppers, the separation chutes and the small-diameter discs are symmetrically provided at both sides of the large-diameter disc respectively,
wherein the first magnet is embedded in the other of the side surfaces of the large-diameter disc with phase position of the first magnet shifted with respect to phase position of the first magnet embedded in the one side surface of the large-diameter disc, wherein the second magnet is embedded in each of the small-diameter discs, and phase positions of the second magnets are shifted to each other in a rotation direction of the small-diameter discs, wherein both the small-diameter discs share the common parts-output port and a common detector, and wherein the small parts accommodated in both the accommodation spaces of the hoppers are alternately outputted to the common parts-output port through the large-diameter disc and both the small-diameter discs.

2. The device for supplying small parts as claimed in claim 1, wherein the large-diameter disc and the small-diameter disc are driven and rotate in synchronization with each other by the rotation driver.

3. The device for supplying small parts as claimed in claim 2, wherein two first magnets are disposed at the large-diameter disc with phase positions of the two first magnets shifted to each other by 180 degrees in a rotation direction of the large-diameter disc.

4. The device for supplying small parts as claimed in claim 3, wherein a mixing magnet is embedded in the one side surface of the large-diameter disc in a center side position with respect to the first magnets, and wherein the mixing magnet mixes the small parts accommodated in bulk in the hopper by an attraction force of the mixing magnet when the large-diameter disc rotates.

5. The device for supplying of small parts as claimed in claim 4, wherein the first magnet and the mixing magnet are embedded in the other of the side surfaces of the large-diameter disc with phase positions of the first magnet and the mixing magnet shifted with respect to respective phase positions of the first magnet and the mixing magnet embedded in the one side surface of the large-diameter disc, wherein the common detector is a noncontact sensor, and wherein the small parts accommodated in both the accommodation spaces of the hoppers are alternately outputted to the common parts-output port through the large-diameter disc and both the small-diameter discs.

6. The device for supplying small parts as claimed in claim 5, wherein the phase position of the second magnet of the one small-diameter disc and the phase position of the second magnet of the other small-diameter disc are shifted to each other by 180 degrees in the rotation direction of the small-diameter discs.

7. The device for supplying small parts as claimed in claim 5, wherein a winding transfer is wound around a shaft, which the pair of small-diameter discs share, and an outer circumferential surface of the large-diameter disc, and the large-diameter disc and the pair of small-diameter discs are driven and rotate in synchronization with each other by the rotation driver through the winding transfer.

8. The device for supplying small parts as claimed in claim 7, wherein the hopper has a substantially quarter spherical shape, and wherein a projected outline of the hopper and a projected outline of the large-diameter disc, which are viewed from an axis direction of the large-diameter disc, are substantially identical to each other.

9. The device for supplying small parts as claimed in claim 1, wherein the small parts are bolts.

10. The device for supplying small parts as claimed in claim 2, wherein the small parts are bolts.

11. The device for supplying small parts as claimed in claim 3, wherein the small parts are bolts.

12. The device for supplying small parts as claimed in claim 4, wherein the small parts are bolts.

13. The device for supplying small parts as claimed in claim 5, wherein the small parts are bolts.

14. The device for supplying small parts as claimed in claim 6, wherein the small parts are bolts.

15. The device for supplying small parts as claimed in claim 7, wherein the small parts are bolts.

16. The device for supplying small parts as claimed in claim 8, wherein the small parts are bolts.

* * * * *